Feb. 8, 1949.   R. CARPENTER   2,460,872
STEAM JOINT

Filed July 16, 1945   3 Sheets-Sheet 1

INVENTOR
RUSSELL CARPENTER.
BY Fetherstonhaugh & Co.
ATTORNEYS

Feb. 8, 1949.  R. CARPENTER  2,460,872
STEAM JOINT
Filed July 16, 1945  3 Sheets-Sheet 3

INVENTOR
RUSSELL CARPENTER
BY Featherstonhaugh & Co.
ATTORNEYS

Patented Feb. 8, 1949

2,460,872

UNITED STATES PATENT OFFICE 2,460,872

STEAM JOINT

Russell Carpenter, Three Rivers, Quebec, Canada

Application July 16, 1945, Serial No. 605,292

7 Claims. (Cl. 285—10)

This invention relates to improvements in steam joints designed for application to steam heated cylinders equipped with a syphon pipe through which condensate is delivered from the interior of the cylinder.

One object of the present invention is to provide an improved steam joint assembly of the character described which is simple in design; is composed of relatively few parts; and can be manufactured and sold at a substantially reduced cost compared with similar steam joints now available.

Another object is to provide a steam joint assembly of the character described in which the steam pipe through which steam is delivered to the steam heated cylinder is supported from the steam supply chamber of the joint assembly on the cantilever principle so that no support for the steam supply pipe is required within the cylinder itself.

A further object is the provision of a steam joint assembly of the character described designed so that the component parts, including the steam supply pipe, can be readily detached from the steam heated cylinder without disturbing the syphon through which condensate is delivered from the interior of the cylinder.

A preferred embodiment of the invention is illustrated in the accompanying drawings, in which—

Figure 1:
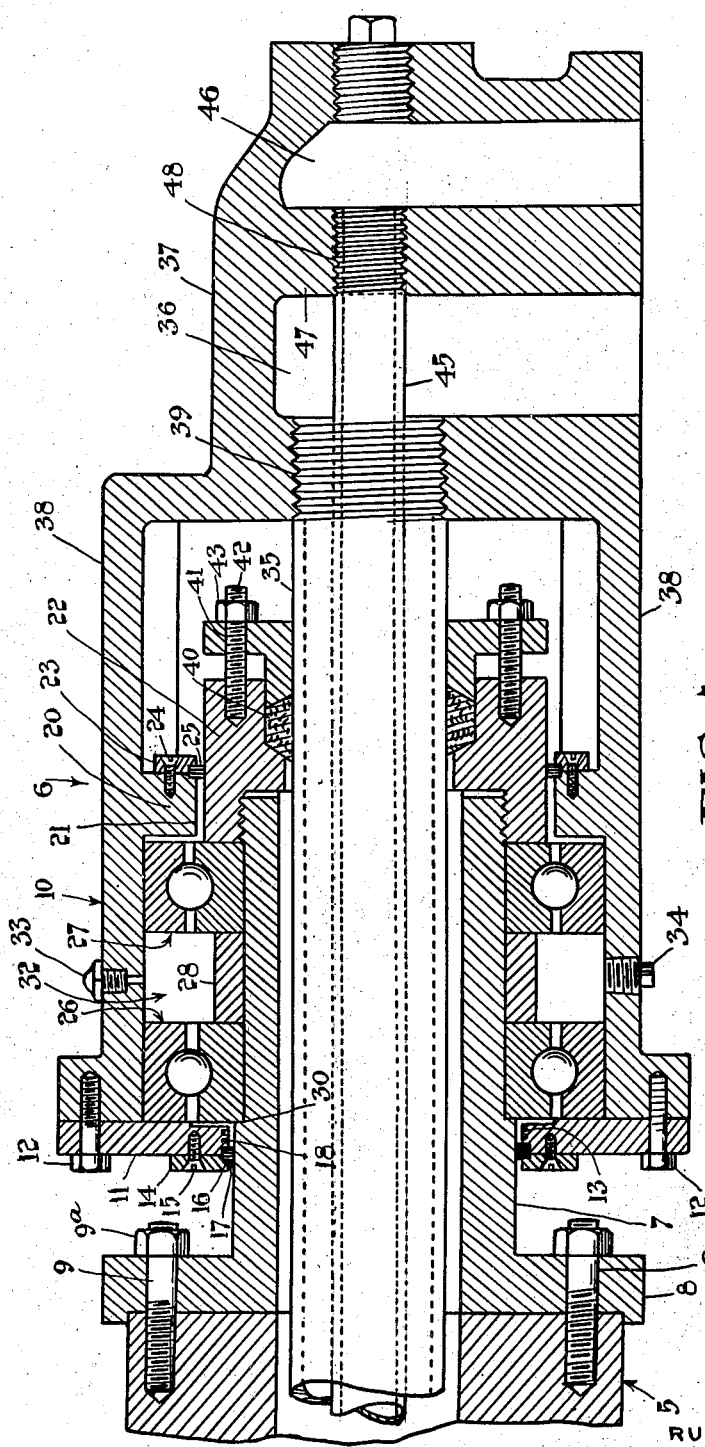
Fig. 1 is a longitudinal sectional view of the complete joint assembly shown in association with the journal of a steam heated cylinder.

In Figure 1 the steam heated cylinder to which my improved joint assembly is applied is represented by the hollow journal 5. The joint assembly is generally indicated at 6. It comprises a tubular member 7 open at both ends and provided, at one end, with a flange 8 which is fastened by bolts 9 and nuts 9a to the end of journal 5 so that member 7 rotates with said journal. Member 7 extends through a stationary bearing housing 10 equipped, at the end nearest journal 5, with a removable end wall 11 secured in place by bolts 12 and provided with a central opening 13 for the passage of member 7. A sealing ring retaining plate 14 is fastened to the outer surface of end wall 11 by screws 15 and is provided with an inwardly facing recess 16 in which a sealing ring 17 is arranged so that said ring is clamped between the wall 14 and an opposing wall of said recess. The inner edge of ring 17 bears against member 7 and serves, in conjunction with the labyrinth sealing grooves 18 in the defining wall of opening 13, to seal said opening.

At its opposite end housing 10 is provided with an integral end wall 20 formed with a central opening 21 to accommodate a stuffing box 22 which is threaded onto the inner end of member 7. A sealing ring retaining plate 23 is fastened to the outer side of wall 20 by screws 24. A sealing ring 25 is clamped in place between recessed portions of wall 20 and plate 23 and bears against stuffing box 22 to seal opening 21. Member 7 is journalled in bearing housing 10 by antifriction bearings 26 and 27 which are spaced from each other by an interposed spacer sleeve 28 encircling member 7. The inner race of bearing 26 is arranged against a shoulder 30 formed on member 7. The inner race of bearing 27 is engaged by the portion of stuffing box 22 threaded onto member 7. The complete bearing assembly, comprising bearings 26 and 27 and spacer ring 28, is clamped against shoulder 30 by the clamping action of the stuffing box 22. The space between bearings 26 and 27 constitutes a lubricant reservoir 32 and is provided with a filling plug 33 and a drain plug 34. A steam supply pipe 35 extends inwardly through stuffing box 22, member 7 and journal 5 from a steam chamber 36 provided in a casting 37 which is integrally connected by upper and lower connecting members 38 to the adjacent end of bearing housing 10. The outer end of steam supply pipe 35 is threaded into a threaded opening 39 provided in the inner side wall of steam chamber 36. It will thus be seen that steam supplied to chamber 36 is delivered through steam supply pipe 35 to the interior of the steam heated cylinder with which the joint assembly is associated.

The stuffing box 22 contains packing 40 which is compressed against the steam supply pipe 35 by a gland 41 which is fastened to stuffing box 22 by gland adjusting means comprising bolts 42 and nuts 43. It will thus be seen that stuffing box 22 prevents leakage between steam supply pipe 35 and the outer end of member 7 and also cooperates with sealing ring 25 to prevent leakage between the stuffing box and the end wall opening 21 of bearing housing 10.

A condensate-removing syphon pipe 45 extends into the steam heated cylinder through steam supply pipe 35 from a condensate-receiving chamber 46 which is positioned at the outer side of steam chamber 36 and is separated therefrom by a partition wall 47 provided with a threaded opening 48 into which the outer end of syphon pipe 45 is screwed.

In the use of the joint described herein the stationary casting 37 is supported in place in any suitable manner. Steam supply and condensate conduits (not shown) are respectively connected to the steam chamber 36 and the condensate-receiving chamber 46. Steam supplied to chamber 36 passes through steam supply pipe 35 into the interior of the steam heated cylinder. The condensate accumulating in the lower portion of the steam heated cylinder is syphoned through pipe 45 into condensate-receiving chamber 46 and is conducted therefrom to any suitable point of discharge. In this assembly the opening at the inner end of member 7 is the only opening which requires to be sealed by the provision of a stuffing box and packing gland.

The assembly provided in accordance with the present invention is also an improvement over prior arrangements in that the bearing housing, the steam supply chamber 36 and the condensate-receiving chamber 46 are all formed as integral parts of a single main casting of comparatively simple design with which the steam supply pipe 35 and syphon pipe 45 can be assembled so that only a single stuffing box is required to seal the joint against leakage of steam through member 7. Another feature of this assembly is that the ball bearings contained in the bearing housing 10 are effectively protected against leakage of steam into said housing by means of the sealing ring 25 cooperating with the stuffing box 22.

Figure 2:
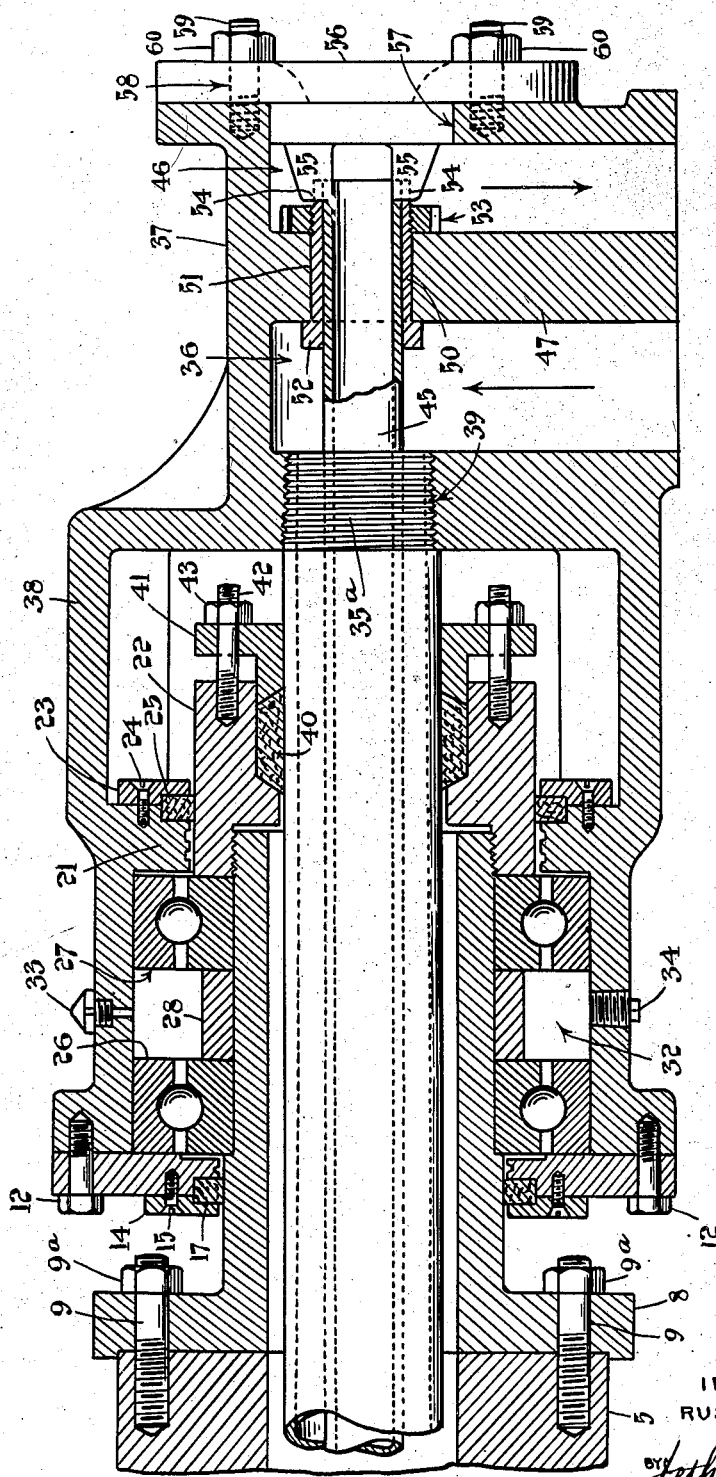
Fig. 2 is a view similar to Fig. 1 but showing a slight modification.
Figure 3:
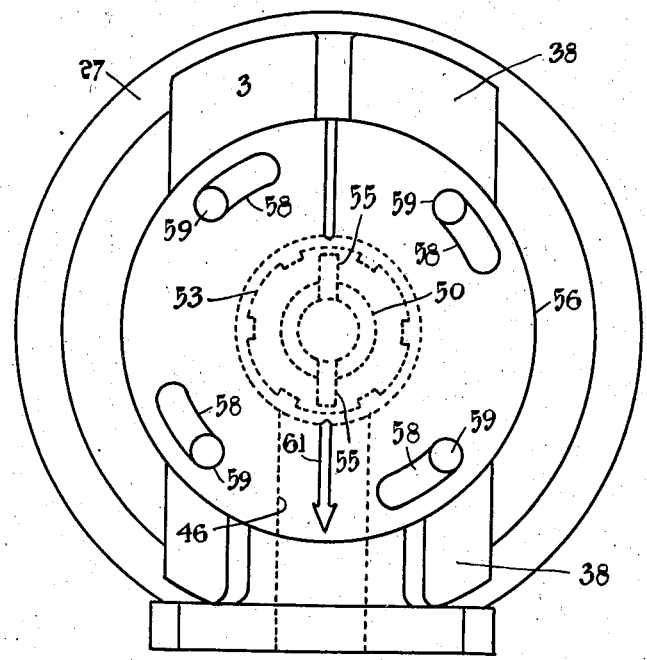
Fig. 3 is an end view of the modified joint assembly shown in Fig. 2.
Figure 4:
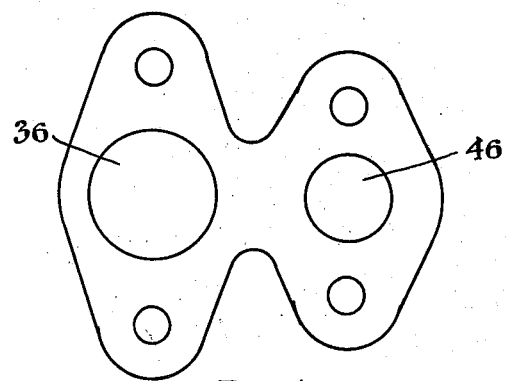
Fig. 4 is a bottom plan view of a part of the assembly shown in Figs. 2 and 3.

In the modified assembly shown in Figs. 2 to 4 inclusive, a sleeve 50 is welded onto the outer end of syphon pipe 45 and is slidably fitted in a non-threaded opening 51 provided in the partition wall 47 separating the steam chamber 36 from the condensate-receiving chamber 46. One end of sleeve 50 is enlarged to provide a shoulder 52 which is butted against the inner side of partition wall 47. The other end of sleeve 50 is threaded to receive thereon a clamping nut 53 by means of which the sleeve and the syphon pipe are held against longitudinal displacement relative to partition wall 47. The outer end of sleeve 50 projects beyond nut 53 and is provided with slots 54. These slots receive therein lugs 55 projecting inwardly from a syphon pipe adjusting plate 56 which is bolted in place over an opening 57 provided in the outer end of casting 37. Plate 56 is provided with arcuate slots 58 for the passage of studs 59 projecting from the outer end of casting 37. Clamping nuts 60 are threaded onto the outer ends of studs 59 and serve to hold plate 56 in adjusted position. When the nuts 60 are loosened the slots 58 permit plate 56 to be turned to thereby adjust the angular position of syphon pipe 45 through the agency of the lugs 55 engaged in the slots 54 provided in the syphon pipe sleeve 50. After this adjustment has been made the nuts 60 are tightened to secure plate 56 and the syphon pipe 45 in adjusted position. The plate 56 is preferably provided with a pointer 61 which indicates the angular position of the syphon pipe.

In the arrangement shown in Figs. 2 to 4, inclusive the steam supply pipe 35 is a relatively strong, thick-walled pipe provided with a finely threaded outer end portion 35a of substantial length which is screwed into a similarly threaded opening 39 provided in the inner side wall of steam chamber 36. Pipe 35 is supported entirely in place on the cantilever principle by its threaded connection with the inner side wall of steam chamber 36 and does not require the provision of any additional supporting means within the journal 5 of the steam heated cylinder.

One of the important advantages of the arrangement shown in Figs. 2 to 4 inclusive, is that the component parts of the steam joint assembly, including the steam supply pipe 35, may be detached from the journal 5 and removed to an out-of-the-way position without disturbing the syphon pipe 45. This is accomplished by removing the nuts 9a from the bolts 9 and by unscrewing the nut 53 from the syphon pipe 45 after removing the syphon pipe adjusting plate 56. This removal of the nuts 9a and 53 and plate 56 permits the entire steam joint assembly including the steam supply pipe 35 to be drawn outwardly away from the journal 5 and over the syphon pipe 45. In this connection it will be noted that the steam pipe 35 is large enough so that it will slide freely over the sleeve 50 welded to the outer end of the syphon pipe.

Having thus described the nature of my invention and a preferred embodiment thereof, it will be understood that various modifications may be resorted to within the scope and spirit of the invention as defined by the appended claims.

I claim:

1. A steam joint attachment for a rotary steam heated cylinder comprising a conduit open at both ends and having one end rigidly attached to the outer end of a hollow journal of said cylinder, a syphon pipe and a steam supply pipe extending upwardly through said journal and said conduit, said syphon pipe being arranged in said steam supply pipe, a stationary casting provided with a steam supply chamber into which the outer end of the steam supply pipe extends and a condensate-receiving chamber into which the outer end of the syphon pipe extends, a stationary bearing housing interposed between the casting and the journal and rigidly supported by said casting, said housing surrounding said conduit and being provided with end wall openings for the passage of said conduit, means sealing the end wall opening of the housing nearest the journal, means sealing the opposite end wall of the housing including a stuffing box through which the steam pipe extends, said stuffing box being carried by the outer end of said conduit and bearings arranged in said housing between the conduit and the surrounding wall of the housing.

2. A steam joint attachment for a rotary steam heated cylinder comprising a conduit open at both ends and having one end rigidly attached to the outer end of a hollow journal of said cylinder, a syphon pipe and a steam supply pipe extending outwardly through said journal and said conduit, said syphon pipe being arranged inside said steam supply pipe, a stationary casting provided with a steam supply chamber into which the outer end of the steam supply pipe extends and a condensate-receiving chamber into which the outer end of the syphon pipe extends, a stationary bearing housing located between the casting and the journal and rigidly supported by the casting, said housing being provided with end wall openings for the passage of said conduit, means for sealing the end wall of the housing nearest the journal, means for sealing the opposite end wall of the housing comprising a stuffing box through which the steam supply pipe extends, said stuffing box being threaded onto the outer end of said conduit and sealing means carried by the outer end wall of said housing and engaging said stuffing box to seal the outer end opening of the housing and a bearing assembly arranged in said housing between said conduit and the surrounding wall of the housing.

3. A steam joint attachment for a rotary steam heated cylinder comprising a casting affording a steam supply chamber and a condensate-receiving chamber separated by an intervening partition wall having a syphon pipe opening therein in line with a larger steam supply opening provided in a side wall of the steam supply chamber, a steam supply pipe having one end supported in said steam supply opening and adapted to extend therefrom into the interior of the steam heated cylinder and a syphon pipe passing through said steam supply pipe and having one end extending through said syphon pipe opening and means for detachably securing said syphon pipe in said syphon pipe opening comprising a sleeve slidably fitted in said opening and welded to the syphon pipe, an enlargement at one end of the sleeve adapted to engage one side of the partition wall in which said syphon pipe opening is formed and a nut threaded onto the opposite end of the sleeve in clamping engagement with the opposite side of said partition wall.

4. A steam joint assembly as set forth in claim 3, in which the last mentioned end of the sleeve extends beyond said nut and is provided with slots in which a syphon pipe adjusting plate is rotatably secured to said casting and is provided with syphon pipe adjusting lugs engaged in said slots.

5. A steam joint attachment for a rotary steam heated cylinder comprising a casting affording a steam supply chamber and a condensate-receiving chamber separated by an intervening partition wall having a siphon pipe opening therein in line with a larger steam supply opening provided in a side wall of the steam supply chamber, a steam supply pipe having one end supported in said steam supply opening and adapted to extend therefrom into the interior of the steam heated cylinder, a siphon pipe passing through said steam supply pipe and having one end extending through said siphon pipe opening, a sleeve slidably fitted in said siphon pipe opening and rigidly secured to the siphon pipe, and means for releasably securing said sleeve in a stationary position in said opening.

6. A steam joint attachment for a rotary steam heated cylinder comprising a casting having a steam supply chamber and a condensate-receiving chamber separated by an intervening partition wall having a siphon pipe opening therein in line with a larger steam supply opening provided in a side wall of the steam supply chamber, a steam supply pipe having one end supported in said steam supply opening and adapted to extend therefrom into the interior of the steam heated cylinder, a siphon pipe for removing condensate from said cylinder, said siphon pipe passing through said steam supply pipe and having one end extending through said siphon pipe opening, a sleeve slidably and rotatably fitted in said siphon pipe opening and rigidly secured to the siphon pipe, means for releasably securing said sleeve in a stationary position within said siphon pipe opening, a siphon pipe rotating member rotatably supported by said casting and motion transmitting means interconnecting said siphon pipe and said siphon pipe rotating member whereby said siphon pipe is rotated to different positions of angular adjustment in response to rotation of said siphon pipe rotating member.

7. A siphon assembly for removing condensate from a hollow steam heated cylinder comprising a condensate-receiving chamber having a siphon pipe opening in one side wall thereof and an opposing opening in the opposite side wall thereof, a siphon pipe having one end extending into said chamber through said siphon pipe opening, a sleeve slidably and rotatably fitted in said siphon pipe opening and rigidly secured to the siphon pipe, means for releasably securing said sleeve against turning or sliding movement relative to the wall of the condensate-receiving chamber in which said sleeve is fitted, a plate rotatably mounted in the opening opposing the siphon pipe opening and motion transmitting means interconnecting said plate and siphon pipe whereby the latter is rotated to different positions of angular adjustment in response to rotation of said plate.

RUSSELL CARPENTER.

REFERENCES CITED

The following references are of record in the file of this patent:

UNITED STATES PATENTS

| Number | Name | Date |
|---|---|---|
| 921,771 | Whitlock | May 18, 1909 |
| 1,797,382 | Wade et al. | Mar. 24, 1931 |
| 1,902,229 | Goetzelman | Mar. 21, 1933 |
| 1,991,432 | Valentine et al. | Feb. 19, 1935 |
| 2,331,615 | Meyer | Oct. 12, 1943 |
| 2,349,696 | Behrens | May 23, 1944 |
| 2,349,792 | Rosenblad | May 23, 1944 |
| 2,350,492 | Carpenter | June 6, 1944 |